No. 790,646. PATENTED MAY 23, 1905.
F. MESINGER.
TIRE.
APPLICATION FILED JAN. 12, 1905.

Witnesses:
Arthur Genger
William Schulz

Inventor:
Frederick Mesinger
by Frank P. Pierce Atty.

No. 790,646. Patented May 23, 1905.

UNITED STATES PATENT OFFICE.

FREDERICK MESINGER, OF NEW YORK, N. Y.

TIRE.

SPECIFICATION forming part of Letters Patent No. 790,646, dated May 23, 1905.

Application filed January 12, 1905. Serial No. 240,698.

*To all whom it may concern:*

Be it known that I, FREDERICK MESINGER, a citizen of the United States, residing at New York city, (Manhattan,) county and State of New York, have invented new and useful Improvements in Tires, of which the following is a specification.

This invention relates to a tire for motor-cars and other vehicles which may be readily attached to the wheel and which permits the ready attachment of the shoe to the tire.

Figure 1:
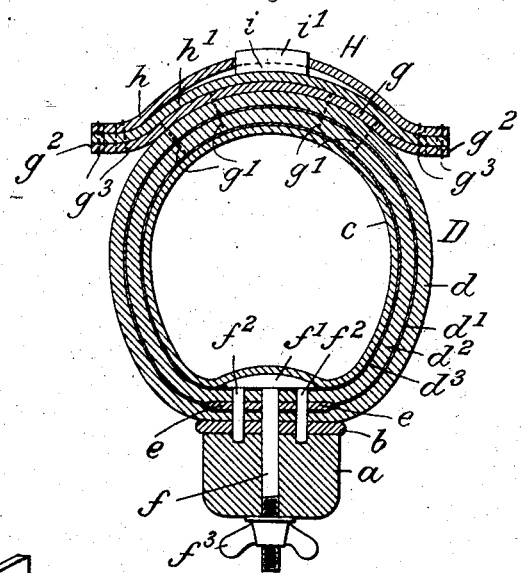
Figure 4:
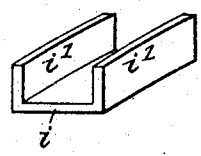
Figure 5:
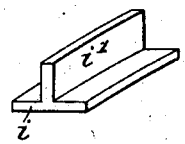
Figure 2:
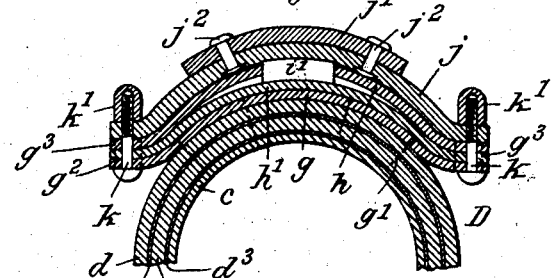
Figure 3:
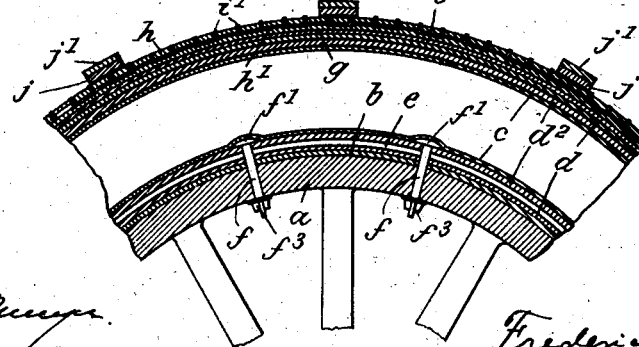

In the accompanying drawings, Figure 1 is a cross-section through my improved tire, showing the snow-creeper removed. Fig. 2 is a similar section with the snow-creeper in position and showing the tire partly broken away. Fig. 3 is a longitudinal section of the tire with the snow-creeper in position, and Figs. 4 and 5 are details of two forms of the runner.

The letter $a$ represents the felly of a wheel, which is preferably reinforced by a metal rim $b$. The tire D, which surrounds the inflation-tube $c$, is composed, preferably, of alternate layers of leather $d$ $d^2$ and canvas $d'$ $d^3$. At its inner side a pair of perforated metal rings $e$ are interposed between the outer canvas layer $d'$ and the inner leather layer $d^2$.

The tire is attached to the wheel by means of bolts $f$, that pass through the tire, rim $b$, and felly $a$. The head $f'$ of bolt $f$ is confined between the tire and the inflation-tube $c$ and is provided with two laterally-arranged pins or teats $f^2$, that pass through alined perforations in the tire and rim $b$ into mortises of the felly $a$. These pins hold all the parts in proper relative position. By manipulating a winged nut $f^3$, that engages the threaded free end of bolt $f$ and bears against the inner surface of the felly, the tire may be readily removed and replaced.

To the outer side of tire D is secured by stitching $g'$ or otherwise a flexible covering $g$. The right and left sides of this covering are disconnected from the body of the tire and diverge from the same, Fig. 1, to form a pair of free laterally-projecting flaps $g^2$. These flaps serve for the removable attachment of the shoe H, shown to consist of an upper layer $h$ and a lower layer $h'$. This shoe is of a width corresponding to that of covering $g$, and consequently projects over flaps $g^2$. Thus the shoe can be readily stitched to the flaps, as at $g^3$, to connect the shoe to the tire and may be as readily removed by ripping the stitches. In this way convenient means are provided for attaching the shoe to the tire or removing it therefrom, so that shoes when worn may be readily replaced.

To reinforce the tread of shoe H, I employ spaced metallic runners, each composed of a base $i$ and a shank or flat web $i'$, projecting at right angles from the base. These runners may be made either of U-iron, Fig. 4, or T-iron, Fig. 5. Their bases $i$ are confined between the layers $h$ $h'$ of the shoe, while their shanks $i'$ project outwardly through transverse slots of the outer layer $h$. In this way the ends of the shanks form a series of transverse ridges upon the shoe that not only strengthen and protect the same, but also guard against creeping under ordinary weather conditions.

To the shoe H may be attached an ice or snow creeper consisting of a number of transverse flexible strips $j$, each reinforced by a shorter outer strip $j'$, riveted thereto, as at $j^2$. The snow-creeper is of a width to extend over the shoe H and may be removably connected thereto and to the flaps $g^2$ of covering $g$ by means of the bolts $k$, carrying the nuts $k'$. If the roads are clear from ice and snow, the creepers may be easily detached, while when the roads are in bad condition they may be as easily applied.

It will be seen that my improved tire may be readily attached to the wheel, while the shoe when worn may be readily removed and replaced, so that in this way the life of the tire is greatly prolonged.

What I claim is—

1. The combination of a felly with a tire, a bolt engaging the felly and tire, and pins on the bolt-head that pass through the tire into the felly, substantially as specified.

2. A tire provided with a covering having laterally-extending flaps, a shoe secured thereto, a series of transverse strips extending across the shoe, and means for removably securing said strips to the shoe and the flaps, substantially as specified.

Signed by me at New York city, (Manhattan,) New York, this 30th day of December, 1904.

FREDERICK MESINGER.

Witnesses:
FRANK V. BRIESEN,
WILLIAM SCHULZ.